United States Patent
Haile et al.

(10) Patent No.: US 11,117,055 B2
(45) Date of Patent: *Sep. 14, 2021

(54) SYSTEMS AND METHODS FOR VALIDATING LEADERBOARD GAMING DATA

(71) Applicant: Activision Publishing, Inc., Santa Monica, CA (US)

(72) Inventors: Paul R. Haile, Los Angeles, CA (US); Paul Kerby, Preston (GB); Calvin A. Lin, Los Angeles, CA (US); John Hamill, Dublin (IE); Christopher T. Reynolds, North Vancouver (CA); Seok Lee, Epping (AU); Martin Donlon, Woodland Hills, CA (US); Ewan Oughton, Los Angeles, CA (US)

(73) Assignee: Activision Publishing, inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/714,047

(22) Filed: Dec. 13, 2019

(65) Prior Publication Data
US 2020/0188793 A1    Jun. 18, 2020

Related U.S. Application Data

(63) Continuation of application No. 15/833,055, filed on Dec. 6, 2017, now Pat. No. 10,537,809.

(51) Int. Cl.
*A63F 9/24* (2006.01)
*A63F 13/73* (2014.01)
*A63F 13/35* (2014.01)
*A63F 13/803* (2014.01)
(Continued)

(52) U.S. Cl.
CPC .............. *A63F 13/73* (2014.09); *A63F 13/30* (2014.09); *A63F 13/35* (2014.09); *A63F 13/803* (2014.09); *A63F 13/837* (2014.09)

(58) Field of Classification Search
None
See application file for complete search history.

(56) References Cited

U.S. PATENT DOCUMENTS

| 5,530,796 A | 6/1996 | Wang |
| 5,561,736 A | 10/1996 | Moore |
| 5,563,946 A | 10/1996 | Cooper |

(Continued)

FOREIGN PATENT DOCUMENTS

| AU | 768367 | 3/2004 |
| AU | 2005215048 | 10/2011 |

(Continued)

*Primary Examiner* — Lawrence S Galka
(74) *Attorney, Agent, or Firm* — Novel IP

(57) ABSTRACT

The present specification describes systems and methods for filtering a video game user's match performance data or loadout data through validation mechanisms. For the performance data, the validated, signed performance data are written to a leaderboard service of the video gaming system. For the loadout data, the validated, signed performance loadout data are transmitted back to the client device and used when playing a game. Free computing and/or networking resources of the client game device are used as an intermediate between the client devices, validation services, and/or leaderboard services.

30 Claims, 8 Drawing Sheets

(51) Int. Cl.
  *A63F 13/30* (2014.01)
  *A63F 13/837* (2014.01)

(56) References Cited

U.S. PATENT DOCUMENTS

| | | |
|---|---|---|
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,169,050 B1 | 1/2007 | Tyler |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,480,656 B2 | 1/2009 | Harris |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,517,282 B1 | 4/2009 | Pryor |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |

(56) References Cited

U.S. PATENT DOCUMENTS

| | | |
|---|---|---|
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,977,742 B1 * | 3/2015 | Tang .................. G06F 21/554 709/224 |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,979,550 B1 * | 5/2018 | Fiedler .................. H04L 67/141 |
| 2004/0242321 A1 | 12/2004 | Overton |
| 2007/0218996 A1 | 9/2007 | Harris |
| 2007/0238528 A1 | 10/2007 | Harris |
| 2007/0276521 A1 | 11/2007 | Harris |
| 2008/0305869 A1 | 12/2008 | Konforty |
| 2009/0113448 A1 | 4/2009 | Smith |
| 2010/0331078 A1 * | 12/2010 | Thompson ............. A63F 13/35 463/29 |
| 2013/0331180 A1 | 12/2013 | Heller |
| 2014/0344725 A1 | 11/2014 | Bates |
| 2016/0191671 A1 | 6/2016 | Dawson |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |

(56) References Cited

FOREIGN PATENT DOCUMENTS

| | | |
|---|---|---|
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

FIG. 3

SYSTEMS AND METHODS FOR VALIDATING LEADERBOARD GAMING DATA

CROSS REFERENCE

The present application is a continuation application of U.S. patent application Ser. No. 15/833,055, entitled "System and Method for Validating Video Gaming Data" and filed on Dec. 6, 2017, which is herein incorporated by reference in its entirety.

FIELD

The present specification is related generally to the field of video gaming. More specifically, the present specification is related to systems and methods for filtering and validating a user's match performance in a video game and writing the validated, signed performance information to the leaderboard service of the video game.

BACKGROUND

To deliver, enable, and host multi-player video game sessions, it is essential that various types of video game data be validated and authenticated. Failure to properly validate video game data could result in 1) the inaccurate ranking of players, 2) the rewarding of players who choose to improperly acquire resources, 3) disadvantaging players who engage with the game in accordance with the established rules, and 4) the general destruction of the quality of game play, as players start to believe that gameplay results are governed more by cheating than by skill. It is therefore imperative to insure that all video game data is properly filtered, validated, and/or authenticated.

For example, in many video games, a player may compete against another player either in person or via an online platform that integrates the play of multiple players through a network. Sometimes, when players play a game, they store, on their client device, a "loadout" that comprises data representative of the outfits, weapons, guns, grenades, ammunition, abilities, and other items (cosmetic or functional) owned by, or accessible to, a player's character. When playing a multiplayer game, those loadouts are transmitted from one client device to the client devices of other players so the character may be properly represented in the gaming environment of other players. Additionally, many online games offer "leaderboards" which allow a player to judge their performance in a particular game play session relative to other game players. Most leaderboards measure a level achieved and certain standard statistics, such as the amount of time played to achieve the level. Simple performance metrics are often used to display basic performance statistics. Examples of such metrics include the number of kills, kill/death ratio, scores, achievements, timings, and levels passed. This data is transmitted by a game client running on the player's home console or personal computer (PC) to the leaderboard service hosted at the back end of the gaming system.

Video game data, such as the loadout and leaderboard data described above, are susceptible to hacking, thereby potentially giving a player's character resources or representing scores it otherwise would not have had. Specifically, one of the major challenges encountered by video game leaderboard programs in providing detailed real time performance data for each player is to ensure that the data is both accurate and truthful. Compromised console hardware is often used at the client end to send modified game statistic data to the leaderboard service. For example, debugging or PC hacking tools may be used to modify data stored in a memory on a PC or a console. Users at home can attach a debugger or other tools to the running game to modify the data directly within the memory and set it to any value they want, before it is sent to the leaderboards service. Once a game console is modified, data from that game console cannot be trusted as the game client can be manipulated to send any information directly to the leaderboards in the absence of any intermediary checks to ensure the validity of the data. The problem is compounded in that the game backend is riddled with management of large amounts of data from numerous players based on non-standard game statistics. Therefore it becomes difficult to run validation checks at the backend on every data entry.

Some gaming systems use post-match validation systems on the game client to ensure that the game log appears reasonable and to identify evidence of boosting statistics or collusion or tampering with the leaderboard. However, client-side validation cannot be trusted because once the client is compromised, any data can be tampered with. Further, typically with online multiplayer games, very little historical information about a player is available on the game client, such as a console, PC or mobile device, which is important for validating statistics of the game last played. This is because such a feature is bandwidth and memory intensive, as it requires the player information to be loaded and saved between matches. It is not feasible to store and manage large amounts of historical performance information, as the data would have to be uploaded each time a match is played.

The same issue applies to loadout data. Compromised console hardware may be used at the client end to send modified loadout data to other client devices. For example, debugging or PC hacking tools may be used to modify loadout data stored in a memory on a PC or a console and improperly associate resources, such as weapons, ammunition, clothing, powers, abilities, and other assets, with the player's profile. Once a game console is modified, loadout data from that game console cannot be trusted as the game client can be manipulated to send any information directly to other client devices in the absence of any intermediary checks to ensure the validity of the data. One could solve part of the problem by having the client devices of other players upload the loadout of a player to a backend to validate the loadout of the player, but this can be resource intensive and highly duplicative (since multiple client devices would be independently trying to validate the same loadout).

Therefore, there is a need for methods and systems that address the above challenges and provide performance and/or loadout data in real time to the players that is both accurate and validated. Such a system should be capable of overcoming the drawbacks of client-side validation and provide a validation service that is remote yet secure, without being bandwidth or memory intensive.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a method for validating leaderboard data in a video game system, the system comprising a gaming program, configured to execute in a client device, and which, when executed, generates a video game to be played by a user, said client device having a processor and a random access memory, wherein said processor is in data communication with a display and with a storage unit, and at least one server device having a server processor and a plurality of programmatic instructions stored in a non-transient memory, wherein said plurality of programmatic instructions are executed by the server processor to run a validation service and a leaderboard service, the method comprising: transmitting results of a game after the game is completed, by the gaming program to the at least one server device running the validation service; determining if the results are valid using a validation mechanism executed by said validation service; discarding invalid results; generating a signed payload of valid results and transmitting the signed payload from at least one server device executing validation service to the gaming program executing in the client device; uploading the signed payload from the gaming program executing in client device to the at least one server device running the leaderboard service; processing the signed payload by the leaderboard service to obtain validated results; discarding the payload if the processing fails to obtain validated results; and adding the validated results to leaderboard data, if the processing successfully obtains validated results.

Optionally, the signed payload received from the validation service is stored in the client device until it is uploaded to the leaderboard service.

Optionally, data in said signed payload is encrypted by the validation service using an encryption algorithm prior to transmitting it to the client device.

Optionally, processing the encrypted data in the signed payload by the leaderboard service decrypts the signed payload. Optionally, the leaderboard service decrypts the data in the signed payload using said encryption algorithm that is used to by the validation service to encrypt the data.

Optionally, the results comprise statistical data associated with a game played.

Optionally, said validation service and said leaderboard service are executed on different servers.

Optionally, said servers are implemented by a cloud of computing platforms operating to provide the validation service and the leaderboard service.

Optionally, the video game system further comprises at least one database.

Optionally, the results that are discarded as invalid by the validation service are stored in said at least one database for further analysis.

Optionally, the results that are discarded as invalid by the leaderboard service if the decryption of signed payload fails, are stored in said at least one database for further analysis.

Optionally, the validation mechanisms executed by said validation service check the results for tampered data.

Optionally, the validation mechanisms to check the results include checking for data time stamps, negative values, impossible values, and corrupt match data.

Optionally, the validation mechanisms executed by said validation service check the results to determine if scores, points or achievements of the user does not exceed a predefined threshold.

Optionally, the validation mechanisms executed by said validation service check the results to determine if an increase in a level of the user does not exceed a predefined threshold.

Optionally, the validation mechanisms executed by said validation service check the results to determine if rewards earned by the user do not exceed a predefined threshold.

Optionally, the validation mechanisms executed by said validation service check the results to determine if a race was completed under a minimum threshold time.

Optionally, the validation mechanisms executed by said validation service check the results to determine if the user shot an enemy from beyond a predetermined distance.

Optionally, the validation mechanisms executed by said validation service check the results to determine if the user moves around a virtual map in impermissible ways.

Optionally, the validation mechanisms executed by said validation service check the results to determine if the user has an unlimited amount of ammunition, health, or armor.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 3 illustrates an exemplary GUI displaying leaderboard results for a game;

DETAILED DESCRIPTION

Figure 1:
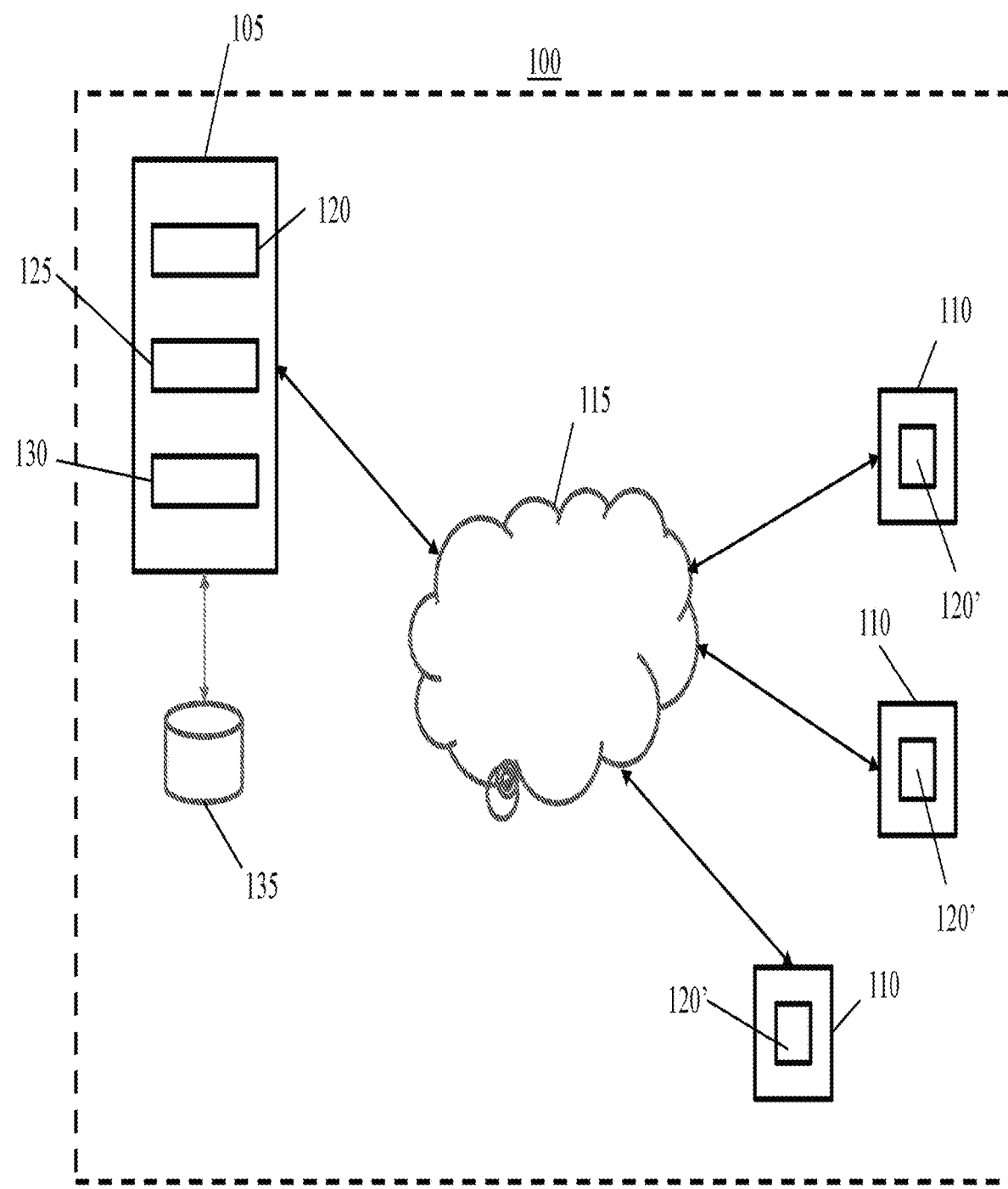
FIG. 1 is a block diagram illustration of a client-server architecture of a gaming system, in accordance with embodiments of the present specification.

The present specification describes systems and methods for filtering a video game user's match performance data through validation mechanisms, and transmitting and writing the validated, signed performance information to the leaderboard service of the video gaming system. In one embodiment, the present method uses the free computing and/or networking resources of the game device or console and uses it as an intermediary between the validation and leaderboard services. This ensures that the validation mechanism and leaderboard service are not dependent on each other for functionality. That is, if one service is not working, the other can still function. For example, if the leaderboard service is inaccessible or inoperative, the validation service can still validate match data from all the games. In one embodiment, the validation service stores relevant data payloads in the client game console or device until the leaderboard service resumes.

The present specification describes systems and methods for filtering a video game user's loadout data through validation mechanisms, and transmitting and writing the validated, signed performance information to other client devices. In one embodiment, the present method uses the free computing and/or networking resources of the game device or console to transmit loadout data, local to the game device, to a validation server. The validation server analyzes the loadout data to determine if the loadout data is authentic, authorized, and/or has been tampered with. If successfully validated, the loadout data is signed, transmitted back to the originating client, and then transmitted to other client devices. If not successfully validated, the loadout data is flagged and the originating player is prevented from using that loadout data in a gameplay session.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

In the description and claims of the application, the term "leaderboard data" shall mean any data which is representative of a player's performance in one or more games, including, but not limited to, numerical scores, times, number of kills, number of points earned, degree of health, degree of level, degree of skill, degree of power, degree of wealth or other performance measurements.

In the description and claims of the application, the term "loadout data" shall mean any data which is representative of the virtual resources or assets associated with a player's virtual character in a game, including, but not limited to, outfits, weapons, guns, grenades, ammunition, clothing, shields, defenses, powers, health, looks, treasure, or other virtual cosmetic or functional assets.

As used herein, the indefinite articles "a" and "an" mean "at least one" or "one or more" unless the context clearly dictates otherwise. The disclosed inventions are directed to an improvement in computer-related technology, namely allowing video game platforms to generate valid and accurate leaderboard data with a decreased risk of corruption or tampering or to generate valid and accurate loadout data with a decreased risk of corruption or tampering, and thus does not recite an abstract idea or concept. In particular, Applicant's specification discloses specific teachings regarding how the claimed inventions improve the validation of leaderboard data or loadout data and are not simply directed to patenting "validated data". Accordingly, Applicant's claimed inventions do not preempt all approaches to obtaining validated leaderboard or loadout data and, instead, are directed to an improvement in video gaming technology grounded firmly in a specific way of achieving the desired outcome of having validated leaderboard data. To the extent the claimed inventions are still considered to be "abstract" in nature, it should be appreciated that each of the claim limitations, when viewed as an ordered combination, amount to significantly more than just an abstract idea or concept.

FIG. 1 illustrates a gaming system 100, in accordance with an embodiment of the present specification. The system 100 comprises client-server architecture, where one or more game servers 105 are in communication with one or more client devices 110 over a network 115. Users may access the system 100 via the client devices 110 that may include, but not be limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115. The one or more game servers 105 are responsible for hosting, running, or executing the video game.

The one or more game servers 105 can be any computing device having one or more processors and one or more computer-readable storage media such as RAM, hard disk or any other optical or magnetic media. The one or more game servers 105 include a plurality of hardware, software, and/or firmware components operating together to provide or implement a plurality of functional, operational or service-oriented modules. In some embodiments, the one or more game servers 105 include or are in communication with a game database system 135. The game database system 135 stores a plurality of game data associated with at least one game that is served or provided to the client devices 110 over the network 115. In one embodiment, the game database system 135 comprises a plurality of databases, each storing a different kind of data. For example, data associated with leaderboard or gameplay results may be stored in a different database, while error reports associated with a game may be stored in a different database. In some embodiments, the one or more game servers 105 may be implemented by a cloud of computing platforms operating together as game servers 105. In embodiments, the game server is another home console, a personal computing device, such as a laptop or tablet PC, or a dedicated server.

In accordance with aspects of the present specification, the one or more game servers 105 provide or implement a plurality of modules such as, but not limited to, a master game module 120, a validation module 125 and a master leaderboard module 130. In one embodiment, the validation module 125 and the master leaderboard module 130 are hosted on a cloud of computing platforms, collectively known as the backend. In the following description, the terms 'game server' and 'backend' are used interchangeably. In some embodiments, the one or more client devices 110 are configured to implement or execute one or more of the plurality of modules that are the same as or similar to the modules of the one or more game servers 105. For example, in some embodiments the client devices 110 execute a client-side game module 120'.

It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game database system 135, and executed by a processor. It should further be appreciated that the terms "service", "procedure", or "method" refer to processes that are implemented by server engines which are specific programmatic structures implemented in either software or hardware. Accordingly, a validation service may be alternatively referred to as a validation server implemented in a form of a plurality of programmatic instructions stored in a non-transient memory and executed by one or more processors.

In embodiments, the master game module 120 is configured to execute an instance of an online game to facilitate interaction of the users with the game. In embodiments, the instance of the game executed may be synchronous, asynchronous, and/or semi-synchronous. The master game module 120 controls aspects of the game for all users and receives and processes each user's input in the game. For example, the master game module 120 may host the online game for users of a particular game, receive game data from the client devices 110 and transmit updates to client devices 110 based on the received game data so that the game, on each of the client devices 110, represents the most updated or current status with reference to interactions of all users with the game. Thus, the master game module 120 transmits the game data over the network 115 to the client devices 110 for use by the game module 120' at the client devices 110 to provide local versions and current status of the game to the users.

On the client-side, each of the one or more client devices 110 implements the game module 120' that operates as a gaming application to provide a user with an interface between the user and the game. The game module 120' generates the interface to render a virtual environment, virtual space or virtual world associated with the game and enables the user to interact in the virtual environment to perform a plurality of game tasks and objectives. The game module 120' accesses game data received from the game server 105 to provide an accurate representation of the game to the user. The game module 120' captures and processes user inputs and interactions within the virtual environment and provides updates to the game server 105 over the network 115. In embodiments, the game module 120' captures and stores a plurality of statistical data or leaderboard data generated as a result of the user's interactions with the virtual environment of the game. The captured and stored leaderboard data is communicated back to or uploaded to the game server 105 in real-time, periodically (such as through batch updates) during a game and/or at an end of the game. The game module 120' accesses updated or most current leaderboard data from the game server 105 and presents or displays the accessed leaderboard data via one or more leaderboard GUIs (Graphical User Interface) to the user.

The game server 105 is preferably configured to concurrently communicate with at least 20 client devices, and more preferably 20 to 1,000,000 client devices or any increment therein, such that each of said at least 20 client devices are permitted to concurrently upload leaderboard data to the game server. In another embodiment, the game server is configured to concurrently host at least 5 leaderboard data transactions per second, preferably 50-150 leaderboard data transactions per second, with the plurality of client devices.

Figure 2A:
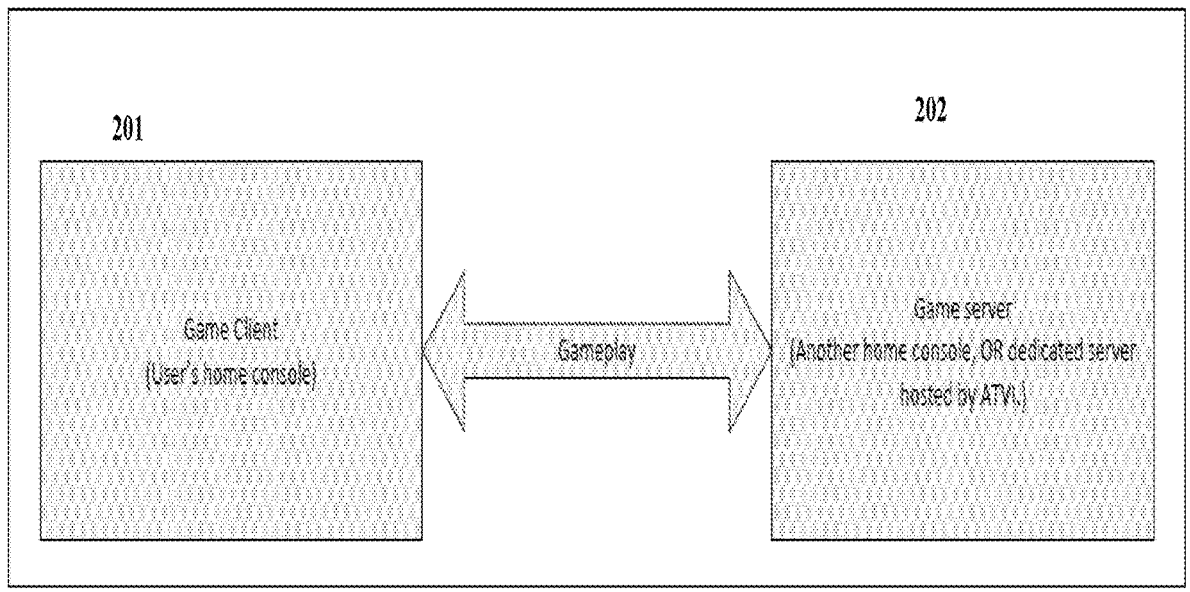
FIG. 2a illustrates a data flow between a game client device and a game server, in accordance with one embodiment.
Figure 2B:
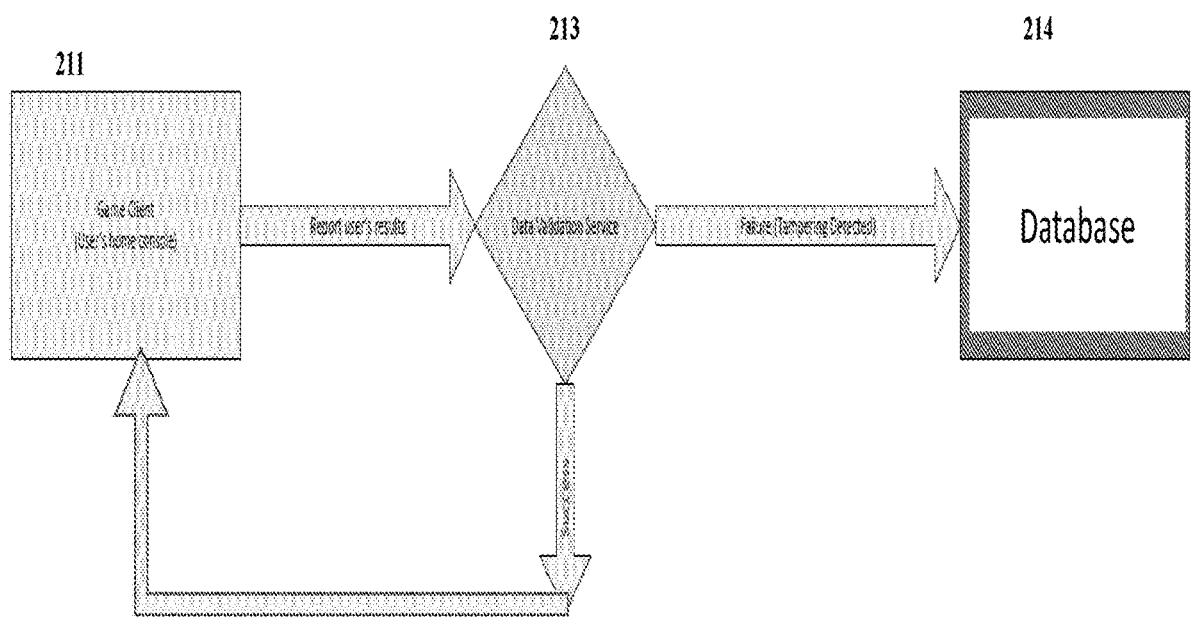
FIG. 2b illustrates the data flow between a game client device and a validation service, in accordance with one embodiment.
Figure 2C:
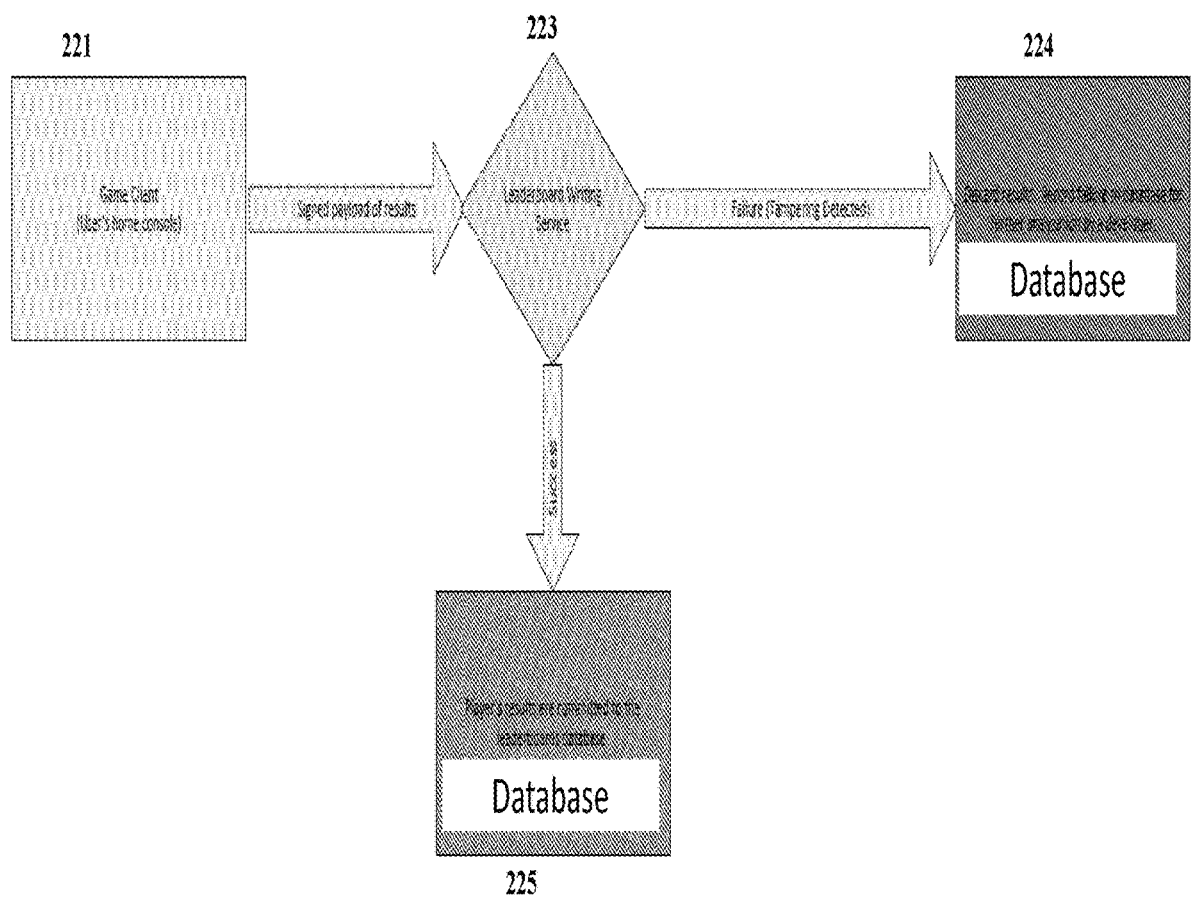
FIG. 2c illustrates the data flow between a game client device and a leaderboard service, in accordance with one embodiment of the present specification.

FIGS. 2a, 2b and 2c are a series of figures that illustrate the data flow between various components of FIG. 1.

Referring to FIG. 2a, the data flow between a game client 201 and a game server 202 is shown. As explained above, a game client comprises a user's home console, personal computer, mobile device or smartphone or any other computing platform capable of being connected to the internet and capable of rendering a video game to be played by the user. During gameplay, the game client 201 communicates with at least one game server 202, which may be a dedicated server or another home based console or computing device, or a computing platform hosted on cloud. In accordance with aspects of the present specification, a plurality of game data is communicated between the client device 201 and the game server 202. This data may be broadly categorized into a first set of data referred to as game-rendering data and a second set of data referred to as leaderboard data. The game-rendering data is associated with accurate rendering, execution or implementation of the online game to all users on their corresponding client devices. In embodiments, the game-rendering data comprises data such as, but not limited to:

a) Data associated with successful and accurate generation of a virtual environment or simulation space of the game. For example, audio-visual and/or graphics data necessary to render the virtual environment on a display screen of the client devices 201 and virtual objects or virtual elements data such as the various types, objectives and behaviors of virtual elements, objects and characters associated with the game;

b) Game target data including data related to the current game targets, goals or objectives as well as data related to the past, present and future status of the targets, goals or objectives of the game;

c) Data related to the users or players of the game. For example, user's identification data (such as a unique login or username and password), user's geographical location data (such as an IP address of the client device of the user), user's experience level or expertize with reference to playing the game, user's preferences, user-controlled virtual character or avatar and its permissible behaviors as well as customizations at various levels of the game, current number of users; and, d) Game identification data related to identification of an instance of the game being played by the users including the timestamp related to when a particular game instance was played by a particular user.

The leaderboard data is associated with a plurality of user related metrics, scoring or statistics and/or in-game event data generated as a result of the user's interactions with the virtual environment of the game. In embodiments, the leaderboard data comprises data such as, but not limited to:

a) Data related to a plurality of scoring events that occur during a match. For example, high scores, kills or captures, fastest time periods to achieve certain scores, clearing or achieving specific game levels and/or win specific matches by a set of 'N' number of top performing users, ranking of the user with reference to the top 'N' users; and, b) Data associated with in-game events such as, but not limited to, movement of the user throughout the virtual environment or topographical map of the game, interaction of the user's avatar with various virtual characters or elements in the game, virtual elements or items used and/or won, damage taken, perks acquired.

It should be appreciated that the leaderboard data will vary depending upon the type, nature and objectives of the game and therefore encompasses any gameplay data relevant to and defined for a particular type of game and its objectives.

In the present specification, the leaderboard data may be referred to as a) client-side or user-specific leaderboard data generated and stored at the client device 201 (as a result of a user playing a game) and communicated back or uploaded to at least one game server 202 or backend, and b) master leaderboard data stored at a game server 202 or backend as a result of processing of leaderboard data received from all client devices of all users. The master leaderboard data is updated with client-side leaderboard data received from all client devices and therefore is representative of comprehensive leaderboard data encompassing the results of all users' interactions with the virtual environment of the game.

FIG. 2b illustrates the flow of data between a validation service 213 of the gaming system and a game client 211. Referring to FIG. 2b in conjunction with FIG. 1, the validation service 213 is implemented via a validation module 125 running on a game server or backend of the gaming system. In embodiments, the validation service 213 is configured to receive client-side leaderboard data generated at a client device 211 and validate the received leaderboard data. In the embodiment of FIG. 2b, the game client 211 reports the user's results after a game, which comprise the client-side leaderboard data, directly to the validation service 213. In one embodiment, this data is received by the validation service directly from the game modules 120' (shown in FIG. 1) of the client devices 110. In alternate embodiments, the client-side leaderboard data is accessed from the master game module 120 that in turn receives the client-side leaderboard data from the game modules 120' of the client devices 110.

Still referring to FIG. 2b, in accordance with a further aspect of the present specification, the validation service 213 processes and analyzes the client-side leaderboard data to determine if the client-side leaderboard data is valid, legitimate, authentic or bona fide and has not been manipulated, altered or tampered with at the client device 211 and/or during transmission from the client device 211 to the backend. In various embodiments, the validation service 213 applies at least one of a plurality of validation procedures or validation methods to the client-side leaderboard data to determine if the data has been manipulated in any way. In some embodiments, the plurality of validation methods are software programmatic instructions stored in the game database system, or in one or more computer-readable storage media of the game servers, in other embodiments.

It should be appreciated that the plurality of validation methods are aimed or directed towards ensuring that the client-side leaderboard data is logical. For example, the plurality of validation methods check data time stamps, look for negative values, impossible values, and corrupt match data. In other words, the plurality of validation methods process the client-side leaderboard data for clues or indications to determine if the data has been modified, such as by a human, and if the data did not come directly from the game itself.

It would be evident to persons of ordinary skill in the art that the plurality of validation methods will vary depending upon the type, nature and objectives of a game and therefore the different types of metrics, points, scoring or statistics and/or in-game event data forming the client-side leaderboard data. The validation methods will also programmatically receive data from a client device and subject it to a plurality of programmatic routines to examine or compare the value of the received data against one or more other data stored in local or remote memory by accessing a memory address of the stored predetermined values, or acceptable values, and performing a programmatic comparison of the received results data with the stored predetermined values.

In accordance with non-limiting examples the plurality of validation procedures or methods may comprise (to determine if data has been tampered with): checking that the score, points or achievements of a team or a single user (player) does not exceed a predefined threshold; checking that an increase in a level of a team or player does not exceed a predefined threshold; checking that rewards, such as money, earned by a team or player does not exceed a predefined threshold; in an exemplary racing game, checking that the race is not completed under a minimum threshold time; checking that a number of virtual elements or items gained by a team or player does not exceed a predefined threshold; and/or checking for occurrences of unlikely or impossible in-game events. For example, but not limited to such examples, tampered gameplay and/or data may be in the form of a player in a basketball game making baskets from beyond a certain predetermined distance from a hoop; a player in a FPS shooting an enemy from beyond a certain predetermined distance; a player moving around the topographical map or virtual map in impossible ways (e.g., "teleports"), or a player or vehicle appears to have unlimited ammunition, health, armor or any other types of virtual elements relevant to the game.

In one embodiment, the limits or thresholds verified by the validation procedures for a game are based on those set by the developer for the particular game. In some embodiments, data regarding limits and thresholds for game metrics are stored in a table in the database associated with the game server, from where it can be accessed by the validation service. One of ordinary skill in the art would appreciate that the applicable limits and thresholds can change depending on the situation, type of game, level of game and the like. In one embodiment, the stored limits and thresholds are continually updated by the game server in the associated database.

If the validation service 213 detects any evidence of tampering within the client side leaderboard data using any of the validation mechanisms it encompasses, as described above, the service discards the tampered gameplay results that were reported. Further, in one embodiment, the failure or rejection of results is recorded and the results that failed the validation tests are stored in a game database 214 for further analysis. Such data stored for analysis may include information such as user ID, console or device ID on which the game was played, device OS details, game version, gameplay or match duration and timestamp, and the detailed statistics generated from the game play.

If the client side leaderboard data successfully pass the validation tests, the validation service 213 encrypts the game results and transmits a signed payload of results back to the game client 211. It may be appreciated that the game client 211 acts as an intermediary between the validation service 213 and the leaderboards service, which are both hosted at the backend of the gaming system. Therefore, the client side leaderboard data, after successful validation is encrypted in a manner such that it cannot be tampered with by the user at the game client 211. Exemplary algorithms that may be used to encrypt and/or sign information payloads before transmission from the validation service or module to the game client include JOSE JWS Signing (HMAC using SHA-256 hash algorithm); Public Key Encryption; and other encryption methods known in the art that may be employed for the purpose, so long as they serve the purpose of securing the data such that it cannot be tampered with at the client end.

FIG. 2c illustrates the flow of data between a leaderboard service 223 of the gaming system and a game client 221. Referring to FIG. 2c, after receiving the signed payload of results from the validation service, the client device 221 transmits the results to the leaderboard service 223. In one embodiment, the leaderboard service 223 is implemented by means of a leaderboard module 130 (shown in FIG. 1) running on a game server 105 or backend of the gaming system. The leaderboard data, as explained earlier, comprises relevant statistical data for games that is recorded by leaderboards. Examples of such data include, but are not limited to, number of wins, losses, kills, deaths, duration of game play, and/or levels achieved. It may be appreciated that leaderboard data in the context of the present specification encompasses any data relevant to a leaderboard for any genre of any game.

The leaderboard data which has been validated by the validation service as being untampered, is sent as an encrypted payload of information to the client device, which, in turn, uploads it to the leaderboard service 223. The signed payload of information is encrypted in manner such that it can be read or decrypted by only the leaderboard service 223. Upon receiving the signed payload from the client 221, the leaderboard service 223 attempts to decrypt the payload. If the leaderboard service 223 fails to decrypt the payload, the data is deemed as invalid or as having been tampered with. In this case, the payload of gameplay results is discarded. Further, in one embodiment, the failure or rejection of payload is recorded and the payload that failed decryption at the leaderboard service 223 is stored in a game database 224 for further analysis. If the leaderboard service 223 succeeds in decrypting the signed payload of information, the decrypted game results are transmitted to another database 225 to be recorded in the game leaderboard. One of ordinary skill in the art would appreciate that the same encryption algorithms that are used by the validation service for encrypting the results and creating a signed payload, are used by the leaderboard service 223 to decrypt the payload of results. In one embodiment, the signed payload also contains specific information or data that can be only read by the leaderboard service 223 and used for decrypting the statistical information in the payload.

Figure 3:
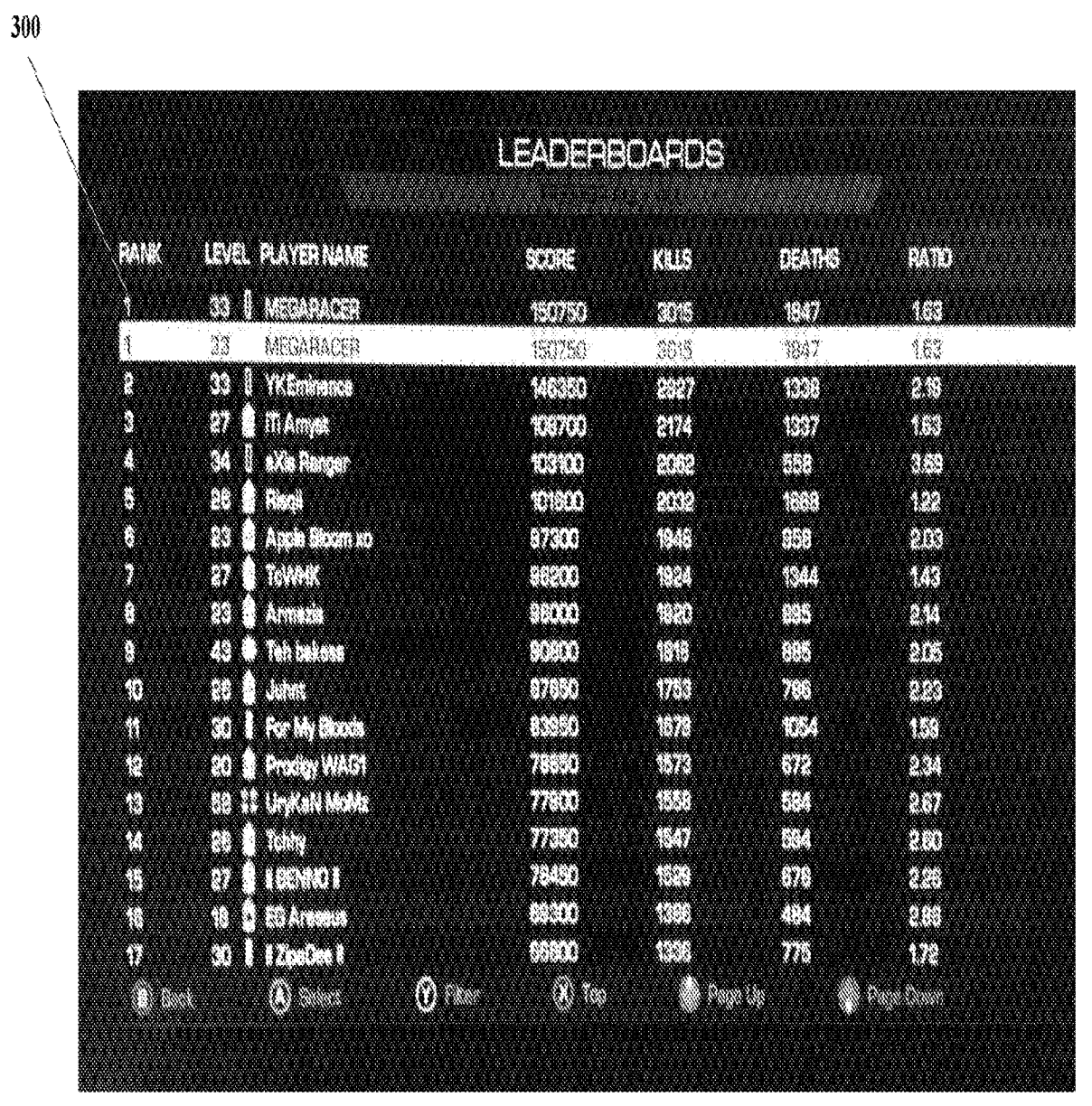

An image of the successfully recorded leaderboard results is subsequently rendered via a GUI on a display associated with the client device. An exemplary leaderboard image 300 is illustrated in FIG. 3.

It may be noted that the validation and leaderboard services, as per the embodiments of the present specification, are distinct services. By obtaining the results from the client device, validating the results and returning a signed payload back to the client device, before it is sent to the leaderboard service, the two services remain independent and do not depend on each other for functionality or operation. In other words, if the leaderboard service is not working or functional, the game results can still be validated. Further, the validated results may be uploaded to the leaderboard service whenever the network and computing environment at both the client end and the game backend are conducive. This feature also takes advantage of the free computing power at a client device, such as a game console's free computing power, and avoids bottleneck problems encountered in networks. This leads to improved speed for users playing the video game and enhanced scalability for game makers.

Figure 4:
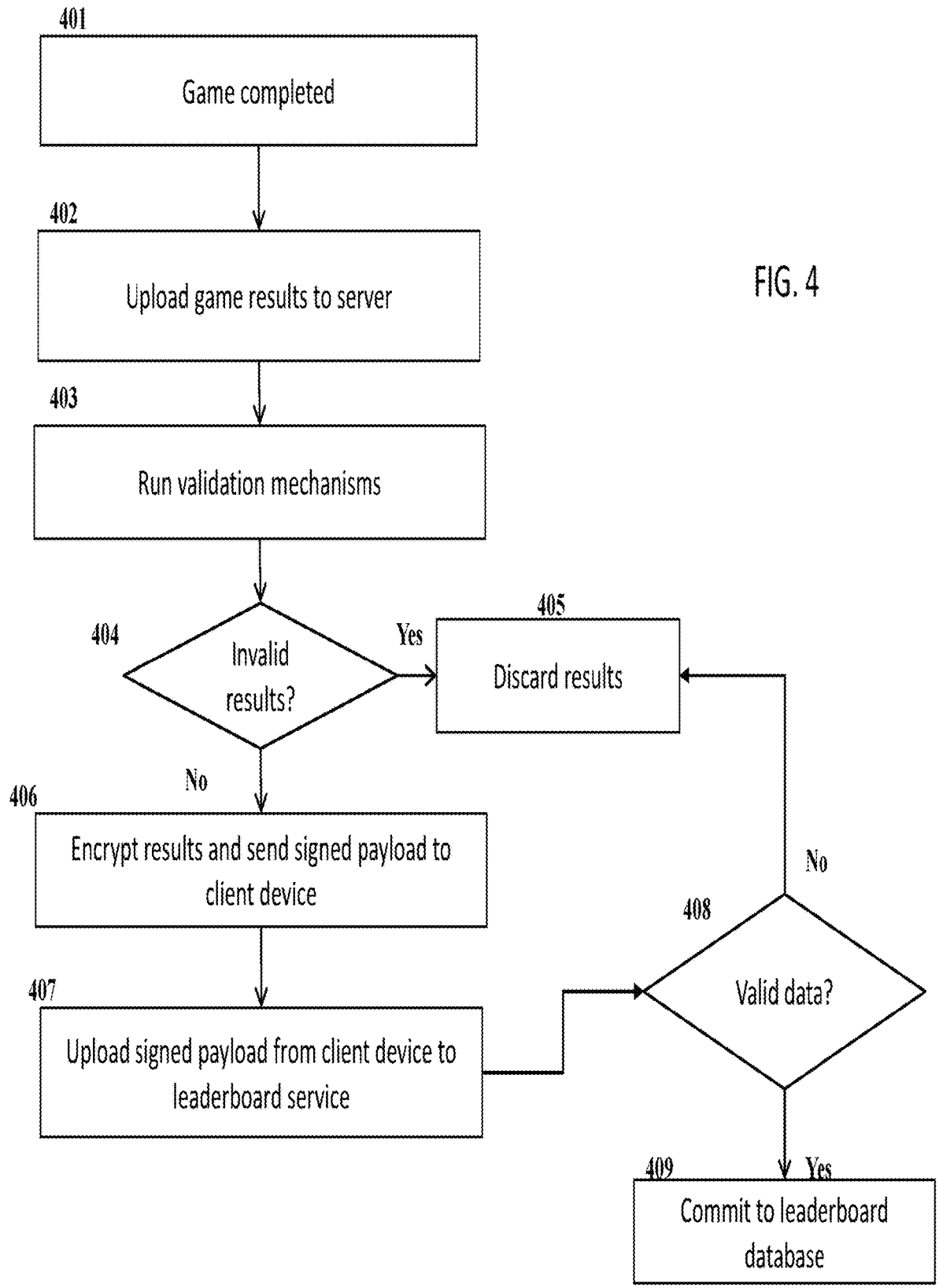
FIG. 4 is a flowchart illustrating steps for validating leaderboard data, in accordance with one embodiment of the present specification.

FIG. 4 is a flowchart illustrating a method of validating leaderboard data, in accordance with an embodiment of the present specification. Referring to FIG. 4, in the first step 401, a game or match is completed by the user at a client device, such as a game console, computer or a mobile device. In the next step 402, the client device uploads the match data and game results to the validation service running at the server end or backend of the gaming system. Validation mechanisms are run on the reported match data and results in step 403, and a check is performed for invalid results in step 404. If either or both of invalid results or data tampering are detected, the results are rejected, as shown in step 405. If the data is found to be valid and untampered, the validation service returns a signed payload to the client device, in step 406. The signed payload comprises the match results and game statistics in encrypted form. In the next step 407, the game client uploads the signed payload to the leaderboard service. This step may be executed after the completion of each match, when the validated payload is received, or it may be scheduled for later if the network conditions are not conducive to the transfer. Thereafter, in step 408, the leaderboard service examines the signed payload to check if the data is valid and attempts to decrypt the data in the payload. If the leaderboard service is successful in decrypting the signed payload, the relevant results are committed to the memory or database associated with the game leaderboards, as shown in step 409. Otherwise, as shown in step 405, the results are rejected. Optionally, the results rejected by the validation service or the leaderboard service are recorded in a separate database, to be analyzed later by game developers.

Figure 5:
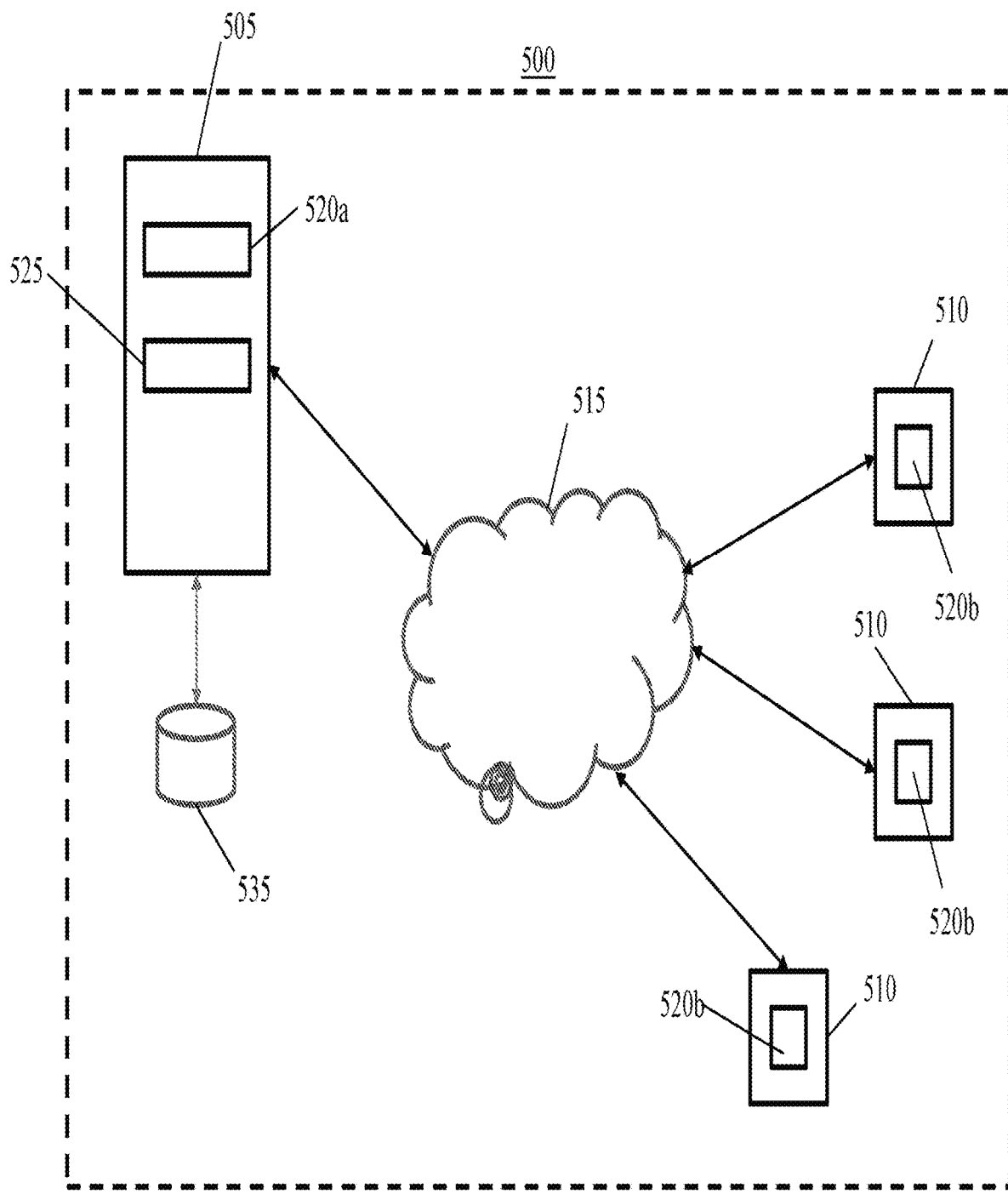
FIG. 5 is a block diagram illustration of another client-server architecture of a gaming system, in accordance with embodiments of the present specification.

FIG. 5 illustrates a gaming system 500, in accordance with another embodiment of the present specification. System 500 comprises client-server architecture, where one or more game servers 505 are in communication with one or more client devices 510 over a network 515. Users may access system 500 via client devices 510 that may include, but not be limited to, personal or desktop computers, laptops, Netbooks, handheld devices such as smartphones, tablets, and PDAs, gaming consoles and/or any other computing platform known to persons of ordinary skill in the art. Although three client devices 510 are illustrated in FIG. 5, any number of client devices 510 can be in communication with the one or more game servers 505 over network 515. Each server 505 is responsible for hosting, running, or executing video games played by users of client devices 510.

Server 505 can be any computing device having one or more processors and one or more computer-readable storage media such as RAM, hard disk or any other optical or magnetic media. Server 505 includes a plurality of hardware, software, and/or firmware components operating together to provide or implement a plurality of functional, operational or service-oriented modules. In some embodiments, server 505 includes or is in communication with a game database system 535. Game database system 535 stores a plurality of game data associated with at least one game that is served or provided to client devices 510. In one embodiment, game database system 535 comprises a plurality of databases, each storing a different kind of data. For example, one database may include data related to known attributes of each player's character. Those known attributes may have been gathered based upon what a player has purchased in the marketplace, or based on prior uploads of data from completed games, or any other. More specifically, such a database may comprise data representative of the virtual resources or assets associated with a player's virtual character in a game, including, but not limited to, outfits, weapons, guns, grenades, ammunition, clothing, shields, defenses, powers, health, looks, treasure, or other virtual cosmetic or functional assets. Another database may include data related to error reports or flagged data associated with a game or a player. In some embodiments, server 505 may be implemented by a cloud of computing platforms operating together as game servers 505. In embodiments, server 505 is another home console, a personal computing device, such as a laptop or tablet PC, or a dedicated server.

In accordance with aspects of the present specification, server 505 includes a plurality of modules such as, but not limited to, a master game module 520*a*, and a validation module 525. In one embodiment, validation module 525 is hosted on cloud of computing platforms, collectively known as the backend. In the following description, the terms 'game server' and 'backend' are used interchangeably. In some embodiments, client devices 110 are configured to implement or execute one or more of the plurality of modules that are the same as or similar to the modules of the one or more game servers 505. For example, in some embodiments the client devices 110 execute a client-side game module 520*b*.

It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game database system 535, and executed by a processor.

In embodiments, master game module 520*a* is configured to execute an instance of an online game to facilitate interaction of the users with the game. In embodiments, the instance of the game executed may be synchronous, asynchronous, and/or semi-synchronous. Master game module 520*a* controls aspects of the game for all users and receives and processes each user's input in the game. For example, master game module 520*a* may host the online game for users of a particular game, receive game data from client devices 510 and transmit updates to client devices 510 based on the received game data so that the game, on each of the client devices 510, represents the most updated or current status with reference to interactions of all users with the game. Thus, master game module 520*a* transmits the game data over network 515 to client devices 510 for use by the game module 520*b* at client devices 510 to provide local versions and current status of the game to the users.

On the client-side, each client device 510 implements game module 520*b* that operates as a gaming application to provide their users with an interface with the game. Game module 520*b* generates the interface to render a virtual environment, virtual space, or virtual world associated with the game and enables the user to interact in the virtual environment to perform a plurality of game tasks and objectives. Game module 520*b* accesses game data received from game server 505 to provide an accurate representation of the game to the user. Game module 520*b* captures and processes user inputs and interactions within the virtual environment and provides updates to game server 505. In embodiments, game module 520*b* captures and stores a plurality of loadout data generated by a user. The captured and stored loadout data is stored in the local client device and also optionally communicated back to, or uploaded to, the game server 505 in real-time, periodically (such as through batch updates) during a game, and/or at the end of the game. Game module 520*b* of a second client device 510 accesses the updated, or most current loadout data of a first client device 510, from either the game server 505 or directly from the first client device 510 without going through the game server 505.

Figure 6:
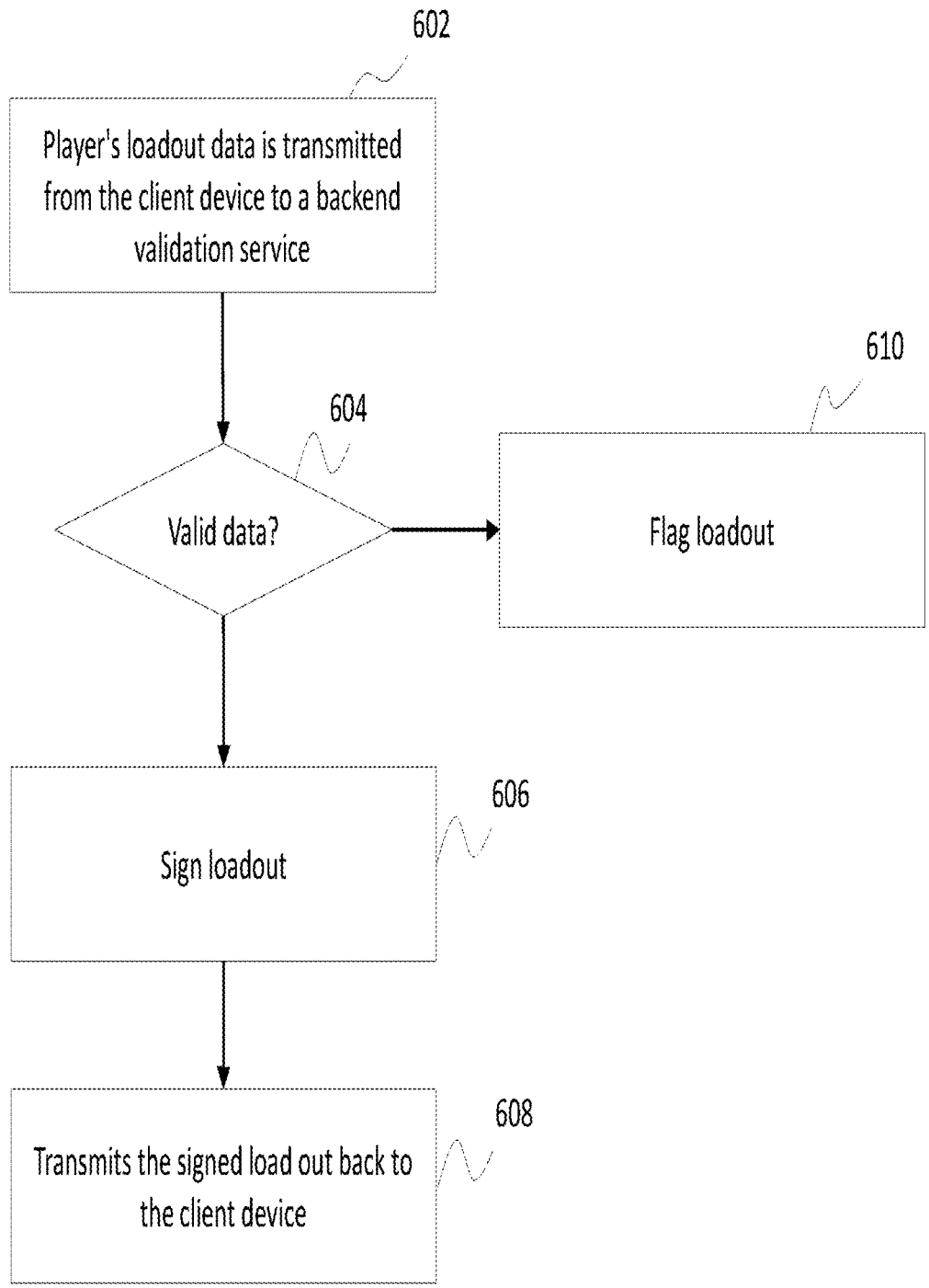
FIG. 6 is a flowchart illustrating steps for validating loadout data, in accordance with one embodiment of the present specification.

FIG. 6 is a flow chart illustrating another method for validating data, in accordance with some embodiments of the present specification. Referring to elements described in context of FIG. 5, during gameplay, a client device 510 communicates with at least one server 505, which may be a dedicated server or another home based console or computing device, or a computing platform hosted on cloud. In one embodiment, the server executes a backend validation service. In accordance with aspects of the present specification, a plurality of loadout data is communicated between the client device and the server. Conventionally, when playing a multiplayer game, loadouts are transmitted from one client device to the client devices of other players so the character may be properly represented in the gaming environment of other players. In embodiments of the present specification, at step 602, the player's loadout is transmitted from the client device and is received by a backend validation service (for example, a service executed by validation module 525) executed by the server in communication with the client device.

At step 604, the validation service compares data in the loadout to a database 535, which includes known attributes of the player's character. Validation of data is performed to establish that the data is correct. In some embodiments, those known attributes are gathered based upon what the player has purchased in the marketplace, based on prior uploads of data from completed games, or any other activity performed by the player. If the comparison validates all the data in the loadout, at step 606, it generates an authenticated loadout data element. The validation service does so by applying, or associating, a digital signature with the loadout data set. The digital signature validates that the data in the loadout is authentic and was not altered, tampered with, or otherwise unauthorized.

One of ordinary skill in the art would appreciate that any method of creating and attaching a digital signature, or electronic validation, to loadout data may be used. In embodiments, asymmetric cryptography is used to generate the signature for validating the loadout data. Client side loadout data, after successful validation, may be encrypted in a manner such that it cannot be tampered with by the player at the client device. Exemplary algorithms that may be used to encrypt and/or sign information payloads before transmission from the validation service to the client device include JOSE JWS Signing (HMAC using SHA-256 hash algorithm), Public Key Encryption, and other encryption methods known in the art that may be employed for the purpose, so long as they serve the purpose of securing the data such that it cannot be tampered with at the client end.

At step 608, the server transmits the authenticated, digitally signed loadout data element back to the client device. The client device then transmits the authenticated, digitally signed loadout to other client devices of other players, thus enabling other players to have confidence that each players loadout represents a valid, authenticated, and proper set of resources legitimately obtained in the course of gameplay and not the result of hacking or cheating.

If the comparison at 604 does not validate the data, the loadout is not signed, and instead, at step 610, the loadout is flagged as being possibly corrupted and the player is unable to play with that character or using that specific loadout.

It may be appreciated that the present system and method reduces interconnection dependencies between backend services and can be used to securely send encrypted data between backend services through client machines. Thus, the use of the present method and system may be extended to other services running at the backend of a gaming system as well. For example, the present method may be applied to transmitting information to the rewards service of the game system as well. As known in the art, many video games include rewards that may be earned depending on achievement of certain in-match performance milestones. These rewards include various virtual objects, assets or abilities that may be used to enhance the gameplay experience and/or the performance of a user. In one embodiment, the system of present specification may be applied to have such performance milestones reported to the validation service from the client device. After ensuring the validity of the milestone data, the validation service may sign the data payload and forward it to the rewards service, either directly or via the client device. The reward service may then use the performance milestone data to generate appropriate rewards for the user.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A method for validating leaderboard data in a video game system, wherein the video game system comprises a gaming program that is configured to execute in a plurality of different a client devices and which, when executed, generates a video game to be played by users and at least one server comprising at least one processor and a plurality of programmatic instructions stored in a non-transient memory, wherein the plurality of programmatic instructions are configured to be executed by the at least one processor to run a validation service and a leaderboard service, the method comprising:
    using the gaming program, transmitting game data of a completed game to the at least one server configured to execute the validation service;
    using the at least one server, determining if the game data are valid using a validation mechanism executed by said validation service, wherein the validation mechanism evaluate the game data for at least one of a) data indicating one of the users shot an enemy from beyond a predetermined distance, b) data indicating if one of the users moves around a virtual map in impermissible ways, or c) data indicating if one of the users has an unlimited amount of ammunition, health, or armor;
    generating an authenticated payload of valid game data and transmitting the authenticated payload from the at least one server to the gaming program executing in at least one of the client devices;
    uploading the authenticated payload from the gaming program to the at least one server configured to execute the leaderboard service;
    processing the authenticated payload by the leaderboard service to obtain validated results; and
    adding the validated results to leaderboard data, if the processing successfully obtains validated results.

2. The method of claim 1, further comprising discarding the authenticated payload if the processing fails to generate validated results.

3. The method of claim 1, further comprising, using the validation service, encrypting data in the validated payload using an encryption algorithm prior to transmitting it.

4. The method of claim 3, further comprising, using the leaderboard service, decrypting the encrypted data.

5. The method of claim 1, further comprising, using the at least one server, discarding invalid game data.

6. The method of claim 1, wherein the game data comprise statistical data associated with a game played between the users.

7. The method of claim 1, wherein said validation service and said leaderboard service are executed on different ones of the at least one servers.

8. The method of claim 1, wherein the at least one server is implemented by a cloud of computing platforms operating to provide the validation service and the leaderboard service.

9. The method of claim 1, further comprising, using the at least one server, discarding invalid game data and storing the discarded game data in at least one database.

10. The method of claim 1, further comprising, using the at least one server, discarding the authenticated payload and storing the discarded authenticated payload if the decryption of the authenticated signed payload by the leaderboard service fails.

11. The method of claim 1, wherein the validation mechanisms is configured to check the game data for tampered data.

12. The method of claim 11, wherein the validation mechanisms is configured to check the game data for at least one of data time stamps, negative values, impossible values, or corrupt match data.

13. The method of claim 1, wherein the validation mechanisms is configured to check the game data to determine if scores, points or achievements of one of the users does not exceed a predefined threshold.

14. The method of claim 1, wherein the validation mechanisms is configured to check the game data to determine if an increase in a level of one of the users does not exceed a predefined threshold.

15. The method of claim 1, wherein the validation mechanism-s is configured to check the results to determine if rewards earned by one of the users does not exceed a predefined threshold.

16. The method of claim 1, wherein the validation mechanism is configured to check the results to determine if a race was completed under a minimum threshold time.

17. A method for validating leaderboard data in a video game system, wherein the video game system comprises a gaming program that is configured to execute in a plurality of different client devices and which, when executed, generates a video game to be played by users and at least one server comprising at least one processor and a plurality of programmatic instructions stored in a non-transient memory, wherein the plurality of programmatic instructions are configured to be executed by the at least one processor to run a validation service and a leaderboard service, the method comprising:
    using the gaming program, transmitting game data of a completed game to the at least one server configured to execute the validation service;
    using the at least one server, determining if the game data are valid using a validation mechanism executed by said validation service;
    discarding invalid results;
    storing the discarded game data in at least one database for further analysis;
    generating an authenticated payload of valid game data;
    transmitting the authenticated payload from the at least one server to the gaming program executing in at least one of the client devices;

uploading the authenticated payload from the gaming program to the at least one server configured to execute the leaderboard service;

processing the authenticated payload by the leaderboard service to obtain validated results; and adding the validated results to leaderboard data, if the processing successfully obtains validated results.

18. The method of claim 17, wherein the validation mechanism is configured to check the game data for tampered data.

19. The method of claim 17, wherein the validation mechanism is configured to check the game data for at least one of data time stamps, negative values, impossible values, or corrupt match data.

20. The method of claim 17, wherein the validation mechanism is configured to check the game data to determine if scores, points or achievements of one of the users does not exceed a predefined threshold.

21. The method of claim 17, wherein the validation mechanism is configured to check the game data to determine if an increase in a level of one of the users does not exceed a predefined threshold.

22. The method of claim 17, wherein the validation mechanism is configured to check the results to determine if rewards earned by one of the users does not exceed a predefined threshold.

23. The method of claim 17, wherein the validation mechanism is configured to check the results to determine if a race was completed under a minimum threshold time.

24. A method for validating leaderboard data in a video game system, wherein the video game system comprises a gaming program that is configured to execute in a plurality of different client devices and which, when executed, generates a video game to be played by users and at least one server comprising at least one processor and a plurality of programmatic instructions stored in a non-transient memory, wherein the plurality of programmatic instructions are configured to be executed by the at least one processor to run a validation service and a leaderboard service, the method comprising:

using the gaming program, transmitting game data of a completed game to the at least one server configured to execute the validation service;

using the at least one server, determining if the game data are valid using a validation mechanism executed by said validation service;

generating an authenticated payload of valid game data;

transmitting the authenticated payload from the at least one server to the gaming program executing in at least one of the client devices;

uploading the authenticated payload from the gaming program to the at least one server configured to execute the leaderboard service;

processing the authenticated payload by the leaderboard service to obtain validated results;

adding the validated results to leaderboard data, if the processing successfully obtains validated results; and discarding the authenticated payload and storing the discarded authenticated payload in at least one database if the decryption of the authenticated payload by the leaderboard service fails.

25. The method of claim 24, wherein the validation mechanism is configured to check the game data for tampered data.

26. The method of claim 24, wherein the validation mechanism is configured to check the game data for at least one of data time stamps, negative values, impossible values, or corrupt match data.

27. The method of claim 24, wherein the validation mechanism is configured to check the game data to determine if scores, points or achievements of one of the users does not exceed a predefined threshold.

28. The method of claim 24, wherein the validation mechanism is configured to check the game data to determine if an increase in a level of one of the users does not exceed a predefined threshold.

29. The method of claim 24, wherein the validation mechanism is configured to check the results to determine if rewards earned by one of the users does not exceed a predefined threshold.

30. The method of claim 24, wherein the validation mechanism is configured to check the results to determine if a race was completed under a minimum threshold time.

* * * * *